United States Patent [19]

Maffet

[11] 4,121,349
[45] Oct. 24, 1978

[54] ORGANIC WASTE DRYING PROCESS
[75] Inventor: Vere Maffet, West Chester, Pa.
[73] Assignee: UOP Inc., Des Plaines, Ill.
[21] Appl. No.: 844,097
[22] Filed: Oct. 20, 1977

Related U.S. Application Data

[63] Continuation-in-part of Ser. No. 813,578, Jul. 7, 1977, which is a continuation-in-part of Ser. No. 775,673, Mar. 8, 1977.
[51] Int. Cl.$^2$ .............................................. F26B 7/00
[52] U.S. Cl. ....................................... 34/12; 34/60; 34/61; 34/62; 71/12; 71/13; 71/14; 110/224
[58] Field of Search .................... 34/12, 60, 61, 62; 71/12, 13, 14; 110/8 P

[56] References Cited

U.S. PATENT DOCUMENTS

| | | | |
|---|---|---|---|
| 2,977,214 | 3/1961 | McLellan | 71/12 X |
| 3,667,131 | 6/1972 | Stephanoff | 34/10 X |
| 4,003,136 | 1/1977 | Vincent | 34/12 |
| 4,057,392 | 11/1977 | O'Donnell | 23/259.1 |

Primary Examiner—Leland A. Sebastian
Attorney, Agent, or Firm—James R. Hoatson, Jr.; John F. Spears, Jr.; William H. Page, II

[57] ABSTRACT

A process for drying organic waste, such as sewage sludge, by contacting the organic waste with hot vapors. In the preferred embodiment, adsorption of hydrocarbons vaporized during the drying step is achieved by mixing recycled dried solids into the drying zone effluent stream. The drying zone effluent stream is then separated into vapor and solids streams, with a portion of the solid stream being recycled as the adsorbent. The unrecycled portion of dry solids is preferably extruded in a separate operation to form compacted granules having good flow characteristics and suitable for application by commercial fertilizer spreaders. In another embodiment, a vapor stream derived from the drying zone effluent stream is contacted with the dry solids downstream of the solids-vapor separation zone to effect the adsorption of hydrocarbon vapors.

11 Claims, 1 Drawing Figure

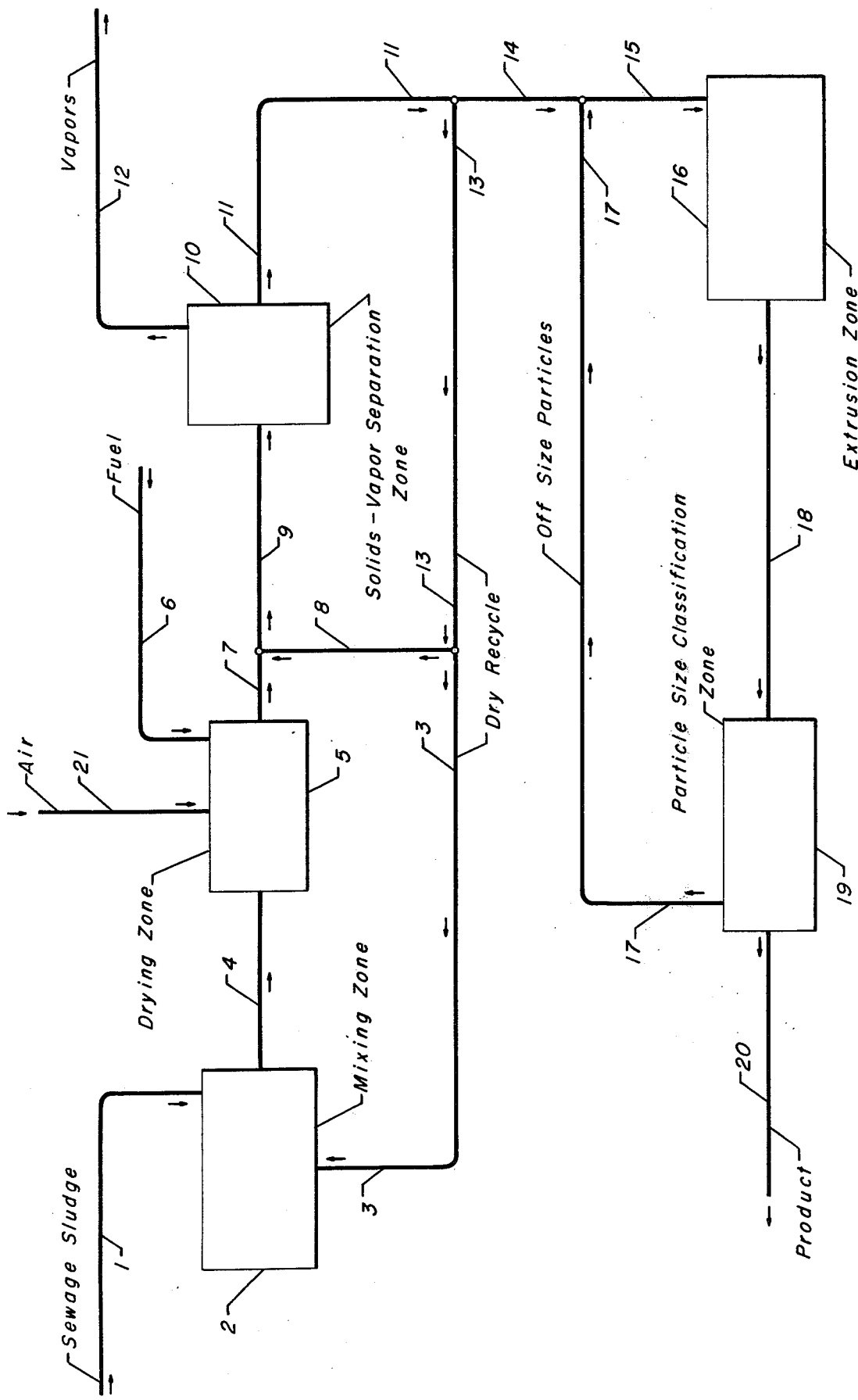

ORGANIC WASTE DRYING PROCESS

CROSS REFERENCE TO RELATED APPLICATIONS

This application is a Continuation-In-Part of my prior copending application Ser. No. 813,578 filed July 7, 1977, which was a Continuation-In-Part of my prior application Ser. No. 775,673 filed Mar. 8, 1977. The teachings of my prior application are incorporated herein by reference.

FIELD OF THE INVENTION

The invention relates to the removal of water from solid organic waste. The invention also relates to the drying of solid material by contacting the solid material with hot vapors. The invention particularly relates to the drying of an organic waste, such as sewage sludge, and to the production of fertilizer or soil builders from the organic waste. The invention also relates to the contacting of a vapor stream with a solid adsorbent to effect the removal of hydrocarbons from the vapor stream.

PRIOR ART

The large amounts of organic waste which are produced annually and the need to dispose of this waste have prompted attempts to develop economic organic waste disposal methods. Increasingly stringent environmental standards have also acted as a stimulus to the development of such methods. One well known method is that utilized in metropolitan Milwaukee, Wisconsin to dry municipal sewage sludge to produce an organic plant food called Milorganite. It is believed that the sludge is dried by the use of large rotating kilns through which hot vapors are passed. A different system in which a flash dryer is used is in operation in Houston, Texas. It is therefore known in the art to dry organic waste by contact with hot vapors.

The prior art processes have other features in common with the subject process. For instance, the vaporous effluent of the drying zone is often passed into a solids-vapor separation zone to collect or remove particles of the solid product. This zone typically comprises one or more cyclone-type separators. Second, it is known in the art to recycle a portion of the dried product and to admix this dry material with the incoming wet feed material. This operation is performed to form a somewhat drier charge material, which is then fed to the drying zone. The drier charge material is desired to expedite the feeding of the organic waste into the drying zone and to avoid accumulation of the raw waste material on the walls of the drying zone.

The preferred toroidal drying zone is well described in the literature. It is described for instance in U.S. Pat. Nos. 3,329,418; 3,339,286; 3,403,451; 3,546,784; 3,550,921; 3,648,936; 3,667,131; 3,856,215; 3,922,796; 3,927,479; 3,945,130; 3,958,342 and 3,974,574. The use of such a dryer in a process for the treatment of organic wastes in taught in U.S. Pat. No. 3,802,089. This reference shows the discharge of the toroidal dryer being directed into a cyclone separator and the recycling of the separator off-gas to the drying zone. The preferred toroidal dryer may be similar in structure to the size reduction apparatus referred to as a fluid energy or jet mill. The subject dryer is operated in a manner similar to many of these mills except for the use of heated gas streams as the high-velocity streams charged to the apparatus.

Previously cited U.S. Pat. No. 3,802,089 discloses the use of a dewatering unit to remove water from organic waste prior to its injection into a toroidal drying zone. The teaching of this reference is, however, limited to the use of a centrifuge or a vacuum filter or a combination of the two. U.S. Pat. No. 3,984,329 presents a conveyor-type device designed for dewatering sewage sludge. Other sludge dewatering devices are presented in U.S. Pat. Nos. 2,097,529 and 4,008,158. My previously filed application Ser. No. 813,577, filed July 7, 1977 discloses a method of dewatering organic waste by extrusion prior to the drying step.

Previously cited U.S. Pat. No. 3,802,089 also discloses the admixture of various additives into the dried material prior to the pelletization of the dried material. The additives disclosed include nutrients to enhance the composition of the product fertilizer and clay, diatomaceous earth, and the like which, when added to the soil, improve drainage qualities or other characteristics of the soil. Another class of disclosed additives are thickening agents and the like for the fertilizer products themselves. My previously filed application Ser. No. 813,578, filed July 7, 1977 discloses the admixture of a plasticizer and an extrusion aid into the dry solids and the extrusion of the dried solids to form a pelleted product.

The prior art also includes appreciation of methods for recycling the vapor stream produced in the solids-vapor separation zone to the combustion area in which the fuel burned in the process is consumed. This allows the combustion of the vaporized hydrocarbons contained in this stream and at least a partial deodorization of the vapor stream. The advantages are a reduction in the fuel requirements of the process and a reduction in the required treatment of the vaporous effluent of the process.

BRIEF SUMMARY OF THE INVENTION

The invention provides a process for drying organic wastes which contain volatile hydrocarbons. In the process a portion of these hydrocarbons, which have been vaporized at the relatively high temperatures used in the drying zone, are removed from the vaporous portion of the drying zone effluent stream and are transferred to the final product of the process. Such transfer reduces the burden placed upon the air quality control equipment which is utilized to remove hydrocarbons from the vapor stream which is eventually discharged from the process.

In the subject process the vaporized hydrocarbons are removed by adsorption onto recycled cold dry solids in one of two different ways. In the preferred embodiment, the cold solids are injected into the effluent of the drying zone at a point between the drying zone and the solids-vapor separation zone. In a second embodiment of the process, the cold solids are contacted with the vapor stream exiting from the solids-vapor separation zone.

The preferred embodiment may be broadly described as a process for drying organic waste which comprises the steps of passing an organic waste stream comprising at least 20 wt.% water, volatile liquid hydrocarbons, and organic waste into a toroidal drying zone and effecting the vaporization of water and hydrocarbons and the formation of a drying zone effluent stream; admixing a solids recycle stream into the drying zone effluent stream at adsorption-promoting conditions; separating the drying zone effluent stream into a vapor stream and a dry solids stream containing less than 15 wt.% water; admixing a first portion of the dry solids stream into the drying zone effluent stream as the solids recycle stream; and forming a second portion of the dry solids stream into particles by extrusion.

DESCRIPTION OF THE DRAWING

To ensure a complete understanding of the inventive concept, a schematic illustration of the preferred embodiment is presented in the Drawing. As the process may be performed using equipment known in the art, a more detailed depiction of the mechanical equipment in each zone is not required. This representation of the preferred embodiment is not intended to preclude from the scope of the invention those other embodiments set out herein or which are the result of reasonable and normal modification of these embodiments.

Referring now to the Drawing, an organic waste feed stream containing sewage sludge from a municipal treatment center is fed into the process in line 1. This material contains liquid phase water and volatile hydrocarbons. It is passed into a mixing zone 2 and commingled with a solids recycle stream from line 3. The effluent of the mixing zone is passed into a drying zone 5 through line 4. The organic wastes are contacted therein by hot vapors generated by the combustion of fuel fed to the process in line 6 with process air from line 21. Preferably, the combustion products are used to form at least part of the hot vapors and are passed directly into the dryer. The drying zone effluent stream comprises the remaining process air, water and hydrocarbons vaporized in the drying zone, combustion products, the dried solid material contained in the sewage sludge of line 1, and the dry recycle solids in line 3.

Another solids recycle stream from line 8 is admixed into the effluent of the drying zone. This admixing is performed at conditions which promote the adsorption of vaporized hydrocarbons by the fluffy dry solids material from this second recycle stream. The material passing through line 8 may be cooled by a means not shown to promote hydrocarbon adsorption. The drying zone effluent stream is then passed through line 9 into a solids-vapor separation zone 10. The fluffy dry solids and the gaseous components of the drying zone effluent are separated in this zone, as by the use of cyclones and electrostatic precipitators. The dry solids are removed in line 11, and a vapor stream comprising excess process air, water vapor, combustion products, and any unadsorbed hydrocarbons, is removed in line 12. The dry solids stream of line 11 is divided between lines 13 and 14. The portion in line 13 is once again divided into the two solids recycle streams carried by lines 3 and 8.

The portion of the dry solids stream in line 14 is admixed with off-size particles carried by line 17, and the resultant admixture is passed through line 15 into an extrusion zone 16. In this zone, the dry solids are compacted at conditions of elevated temperature and pressure sufficient to cause the organic waste to plasticize. The plasticized solid is then extruded to produce pellets of fertilizer or soil conditioner having a much higher bulk density than the fluffy dry solids removed from the solids-vapor separation zone. These pellets are removed in line 18 and passed into a size classification zone 19 as a final finishing step. The pellets are classified according to size as by air blowing or screening, and any dust, undersized particles, and oversized particles are removed for recycling in line 17. The oversized particles may be crushed in a size reduction zone not shown. The finished product is removed in line 20.

DETAILED DESCRIPTION

The drying of organic waste is a multi-step process which may be discussed in terms of the separate operations and their interaction. The overall objective of the process is to dispose of the organic waste and to convert it to a useful and preferably marketable product. In the subject process the organic waste is preferably dried and formed into pellets which may be used as fertilizer or soil conditioner. The subject invention is directed to reducing the hydrocarbon content of the untreated effluent vapor stream of the process. However, the other steps in the process will also be described in some detail to provide a basis for understanding the invention.

As used herein the term "organic waste" is intended to refer to carbon-containing substances that are derived directly from living or formerly living organisms. Specific examples include human sewage, fat, meat scraps, bones, hair, skin, feces and manure from animal sources, beet pulp, fruit pumice, vegetable and fruit peels and culls, eggs, straw and animal bedding, bagasse, fermentation and distillation residues from vegetable sources, cellulose, protein production plant effluents, kelp, and pharmaceutical wastes. In the preferred embodiment, the feed stream to the process comprises a sewage sludge produced in a municipal sewage treatment plant. It may be a primary, secondary, or tertiary sludge, and may be digested or undigested. Preferably, the feed stream to the process contains about 20 wt.% or more solids.

These organic wastes may be dried to form a slow release fertilizer and soil builder. In order to distribute such a fertilizer in the large scale operations of modern commercial agriculture, it is necessary to utilize mechanical spreaders, for which reason the fertilizer particles should be relatively dense and approximately uniform in size and shape. In the prior art the dried organic waste was compressed to solid pieces which were then crushed to form particles of various sizes and shapes. This method also formed considerable quantities of undesired dust. The product particles then had to be sized, e.g. by screening, with the off-size material being recycled. The amount of this off-size material has reached over 50% of the material being compressed, and therefore constituted an extensive and undesirable internal recycle stream. My prior application presents an alternative finishing and drying operation wherein the dry solids are extruded and the amount of off-size material is reduced. Plasticizers or extrusion aids may be admixed with the dry solids to aid their extrusion.

The organic waste fed to the process will contain liquid phase hydrocarbons. For instance, it has been found that about 1.0 to 6.0 wt.% of the solids content of sewage sludge received at a particular testing facility was "oil" or hydrocarbons. This oil may be from several sources including lubricating oils and other hydrocarbon-containing products which have been discarded into municipal sewer systems. Some of the oil will be in the form of volatile hydrocarbons. As used herein the term "volatile hydrocarbon" is intended to refer to hydrocarbons which have either (1) a boiling point at one atmosphere below about 550° F. or (2) a pure component vapor pressure above 60 mm Hg at a temperature of 350° F. The organic waste will also contain hydrocarbons which are not vaporized in the drying zone and are removed in the dry solids. Based on analysis of the prior art dry product, it appears that about 15 to 50 wt.% of the oil which is in sewage sludge remains in the finished product where it is not a problem. The remaining hydrocarbons leave the drying zone of the prior art process as vapors. The drying zone effluent stream may also contain volatile hydrocarbons remaining after incomplete fuel combustion. Unless the vaporous hydrocarbons are consumed in the combustion zone by partial or total vapor recycle, they must be removed in an air quality control system which is used in the process.

It is an objective of the invention to provide a process for drying organic waste. It is another objective of the invention to provide a process for drying organic waste which contains volatile liquid hydrocarbons. It is yet another objective of the invention to reduce the hydrocarbon content of the vapors separated from the effluent of a drying zone in which organic waste is dried.

Basic to the subject process is the use of a drying zone. This may be any mechanical contrivance in which the organic waste is dried. The dryer may be either a direct or indirect dryer and may operate in a batch or a continuous mode. The drying may therefore be effected by contacting the organic waste with a hot surface with intermittent or continuous agitation, but it is preferably accomplished by contacting the organic waste with a hot, relatively dry vapor. There are several ways in which this type of drying may be performed. For instance, the organic waste may be passed into the raised end of a rotating cylindrical kiln while hot dry vapors are passed into the lower end. Other drying systems such as a flash-cage dryer may also be used.

In the preferred embodiment, the drying zone comprises a toroidal dryer. As used herein the term "toroidal dryer" is intended to refer to a dryer in which the material to be dried is passed into an enclosed circular housing wherein the wet material is caused to circulate by hot vapors which are charged to the dryer. It is therefore intended to refer to a dryer similar to that described in the previously cited references including U.S. Pat. Nos. 3,802,089; 3,329,418; 3,403,451; 3,667,131 and 3,856,215. The material to be dried is normally passed into a lower point in a vertically oriented dryer housing and caused to move horizontally by the hot vapors. The wet material is then circulated around the vertically aligned circular loop of the dryer, with dry material being selectively removed with the effluent vapors. The drying conditions used in the drying zone include a pressure which may range from subatmospheric to about 7 atmospheres gauge. Preferably, a toroidal dryer is operated at a slight positive pressure. This pressure may be in the range of from about 0.1 to 0.6 atmospheres gauge. This pressure is required for transportation of the solids.

The heat required to effect the drying may be supplied to the drying zone from any suitable source. It may therefore be supplied by electricity or by a nuclear power plant. The preferred heating method is the combustion of a relatively sulfur-free carbonaceous fluid such as a desulfurized fuel oil or natural gas. The temperature of the hot vapors fed to the dryer may vary from about 500° to about 1350° F. A preferred range of this temperature is 750° to 1250° F.

It has been found by experience that the feed stream to a toroidal dryer should contain at least about 50 wt.% solids. Preferably, it contains about 55 to 70 wt.% solids. This degree of dryness is desirable to prevent portions of the feed stream from depositing on the internal surfaces of the dryer. That is, a soupy feed stream has a tendency to plaster against the walls of the dryer with at least a portion remaining there as an undesired coating. The predominant prior art method of increasing the solids content of wastes such as municipal sludge has been to recycle a portion of the dryer effluent. A representative recycle ratio for this type of operation is the addition of 7 pounds of dried solids collected from the dryer effluent to 5 pounds of sludge containing about 20 wt.% solids, a solids content which is typical of many municipal sewage sludges. The amount recycled is adjusted proportionally for different solids contents in the organic waste stream fed to the process.

The effluent stream of the dryer will contain the dried organic wastes. This material preferably has a water content of about 5–12 wt.%, but higher water contents up to about 15 wt.% may be tolerable. When the drying is achieved through the use of hot vapors, these vapors will also exit the drying zone and will normally contain some entrained fine waste particles. The effluent of the drying zone is therefore passed into a solids-vapor separation zone. This zone preferably contains one or more cyclone separators. Most of the dried waste will be collected by these cyclones. The off-gas of the cyclones may be directed into a wet scrubber such as a turbulent contact absorber, or electrostatic precipitator, or a bag-type filter. The filtered off-gas is then passed through an odor scrubber in which contact with deodorizing chemicals including hypochlorites, peroxides, or permanganate can be effected if necessary. An incineration-type odor scrubber may also be used. When the preferred toroidal dryer is used, the dried solids will be removed from the dryer suspended in the warm effluent vapors and passed to the separation zone. These effluent vapors will also comprise the evaporated water, vaporized hydrocarbons, combustion products, and nitrogen and other gases remaining from the air fed to the process. They may range in temperature from about 190° to 400° F. and are preferably in the range of 200°–300° F. The solids-vapor separatory zone may be of customary design, and those skilled in the art are capable of effecting its design and operation.

The dried organic waste is normally a fluffy, high surface area material having a bulk density of about 12 to 16 lb/ft$^3$. The dried material produced from sewage sludge tends to adhere to itself and does not readily flow or spread. It is therefore difficult to transport or to spread as fertilizer. For these reasons it has been compacted to form a particulate product having an everage bulk density of about 30 to 65 lb/ft$^3$. Preferably, the density of the product is about 30 to 50 lb/ft$^3$. Formation of such a product may be accomplished by the sequential compaction and crushing operations of the prior art. However, the machines required are relatively expensive, require extensive maintenance, and are often unreliable. Further, the product frequently has poor flow characteristics and the prior art method produces a very large amount of off-size material. It is therefore preferred that compaction be accomplished by the extrusion of dried organic waste. Such extrusion may be aided by the addition of about 5 wt.% of a 30% aqueous formaldehyde solution as a plasticizer, or about 5 wt.% of bentonite as an extrusion aid, or a combination of both of these or similar materials.

The extrusion of the dry fluff may be performed in several types of extruders including press-type extruders. The preferred type of extrusion apparatus uses a screw or auger to force the dried organic waste through a face plate having perforations in the range of 1/16 to ¼ inch diameter. The action of the screw within the barrel of the extruder results in the shearing and kneading of the dried waste, and the dried waste is fluxed to a plasticized material within the barrel, with the plasticized material solidifying upon discharge from the extruder. The dried waste may be fed to the extruder at an elevated temperature. Conditions found to be suitable for the plasticization of dried sewage sludge include both a pressure over about 500 psig and a temperature above about 300° F. Uniform pellet formation may be aided by the use of a rotating finger plate.

The effluent of this extrusion zone is then passed into a particle size classification or fines separation zones. The zone may comprise any apparatus which will remove dust, fine particles, and oversized particles from the extrudate. One such apparatus comprises a screening mechanism having two vibrating screens to sort out those particles which will not pass through a 6 mesh screen and also those that pass through a 20 mesh screen. The remaining product is referred to as "minus 6 plus 20" and is typical of the size range preferred in fertilizer production. The oversize may be crushed in any suitable manner and returned to the screens. The fines are recycled to the feed of the extruder. A second type of apparatus which may be used is one which utilizes fluidization of the fine particles in air as a means of particle classification. The apparatus presented in U.S. Pat. No. 3,825,116 performs fine particle separations in this manner.

In the subject process, the vapor phase portion of the drying zone effluent is contacted with a recycle solids stream at hydrocarbon adsorption-promoting conditions. These conditions include a pressure above one atmosphere absolute and a recycle solids stream temperature below that maintained in the drying zone. A broad range of temperatures for the recycle solids stream during the contacting or adsorption step is from about 60° F. to 165° F. Preferably, the adsorption-promoting conditions include an absorbent temperature below 120° F., and more preferably below 100° F.

The desired rate of solids recycle and admixture will be determined by balancing several factors, such as the relative benefits of additional cooling versus additional absorbent, the amount of vaporized hydrocarbons in the drying zone effluent, and the cost of recylcing the dry solids. A broad range of recycle rates calls for the admixture of from 2 to 25 lbs. of dry solids into the drying zone effluent stream for each 100 lbs. of dry solids in the effluent stream. The vapor and solid phases of the effluent stream should be maintained in a state of intimate contact and admixture for a sufficient time to substantially approach vapor-solid equilibrium between the vaporized hydrocarbons and the adsorbent. A contact time in excess of 2 seconds is preferred. The required admixture may be achieved by the use of mechanical mixing means or by transporting the drying zone effluent stream at relatively turbulent flow conditions.

In accordance with this description, the preferred embodiment of the invention may be characterized as a process for drying organic waste which comprises the steps of admixing a first solids recycle stream with an organic waste stream comprising over 75 wt.% water, volatile liquid hydrocarbons, and organic waste, in a mixing zone and forming a mixing zone effluent stream; passing the mixing zone effluent stream into a toroidal drying zone operated at drying conditions and effecting the vaporization of water and hydrocarbons contained in the mixing zone effluent stream and the production of a drying zone effluent stream comprising organic waste, water vapor, and vaporized hydrocarbons derived from the organic waste stream; admixing a hereinafter described second solids recycle stream with the drying zone effluent stream at conditions which promote the adsorption of vaporized hydrocarbons by the second solids recycle stream; separating the drying zone effluent stream in a solids-vapor separating zone and producing a vapor stream comprising water vapor and a dry solids stream comprising particulate organic waste and containing less than about 12 wt.% water; separating the dry solids stream into three portions and admixing a first portion of the dry solids stream with the organic waste stream as the first solids recycle stream; admixing a second portion of the dry solids stream with the drying zone effluent stream as the second solids recycle stream; and extruding a third portion of the dry solids stream in an extrusion zone under conditions sufficient to cause the plasticization of the dry solids and the formation of a product stream having a bulk density of about 30–65 lb/ft$^3$.

In another embodiment of the invention, the drying zone effluent stream is passed into the solids-vapor separation zone as in the prior art. The vapor stream removed from this zone contains both water and volatile hydrocarbons. It is contacted with the dry solids adsorbent at adsorption-promoting conditions in a vapor-solids contacting zone. This zone may be formed by customary apparatus, and may comprise a moving bed type contactor. For instance, the dry solids may be confined to a downward flowing annular or rectangular bed. The vapor stream may alternatively be forced through a horizontal layer of dry solids on a stationary or continuous conveyor-type porous support. Batch contacting operations using a plurality of contacting vessels on a "swing" schedule may also be performed. The adsorption-promoting conditions set out above are also used in this embodiment.

This alternative embodiment has the advantage of allowing the vapor stream to be cooled by indirect heat exchange prior to the contacting step, reducing plugging and contacting problems associated with cooling the mixed-phase drying zone effluent stream. However, the alternative embodiment requires more equipment than the preferred embodiment and would be more expensive to implement.

I claim as my invention:

1. A process for drying organic waste which comprises the steps of:
  (a) passing an organic waste stream comprising 20 wt.% water, volatile liquid hydrocarbons, and organic waste into a drying zone operated at drying conditions and effecting the vaporization of water and hydrocarbons contained in the organic waste stream and the production of a drying zone effluent stream comprising organic waste, water vapor, and vaporized hydrocarbons derived from the organic waste stream;
  (b) separating the drying zone effluent stream in a solids-vapor separating zone and producing a vapor stream comprising vaporized hydrocarbons and water vapor and a dry solids stream comprising organic waste;

(c) contacting the vapor stream with a hereinafter described adsorbent at conditions which promote the adsorption of vaporized hydrocarbons by the adsorbent;

(d) separating the dry solids stream into at least two portions, and contacting a first portion of the dry solids stream with the vapor stream as the previously specified adsorbent of step (c); and, (e) forming a second portion of the dry solids stream into particles having an average bulk density above 30 lb/ft$^3$.

2. The process of claim 1 further characterized in that the adsorbent is cooled to a temperature below about 120° F. before being contacted with the vapor stream.

3. The process of claim 1 further characterized in that the adsorbent is formed into particles having an average bulk density above 30 lb/ft$^3$ after being contacted with the vapor stream.

4. A process for drying organic waste which comprises the steps of:

(a) passing an organic waste stream comprising 20 wt.% water, volatile liquid hydrocarbons, and organic waste into a drying zone operated at drying conditions and effecting the vaporization of water and hydrocarbons contained in the organic waste stream and the production of a drying zone effluent stream comprising organic waste, water vapor, and vaporized hydrocarbons derived from the organic waste stream;

(b) admixing a hereinafter described solids recycle stream into the drying zone effluent stream at conditions which promote the adsorption of vaporized hydrocarbons by the solids recycle stream;

(c) separating the drying zone effluent stream in a solids-vapor separating zone and producing a vapor stream comprising water vapor and a dry solids stream comprising organic waste;

(d) separating the dry solid stream into at least two portions and admixing a first portion of the dry solids stream into the drying zone effluent stream as the previously specified solids recycle stream of step (b); and, (e) forming a second portion of the dry solids stream into particles having an average bulk density above 30 lb/ft$^3$.

5. The process of claim 4 wherein the solids recycle stream has a temperature at least 50° F. below that of the drying zone effluent stream prior to the admixture of the solids recycle stream and the drying zone effluent stream.

6. The process of claim 4 wherein the solids recycle stream is cooled to a temperature below 100° F. before admixture with the drying zone effluent stream.

7. The process of claim 4 wherein the dry solids stream contains less than about 15 wt.% water.

8. The process of claim 7 wherein the drying zone comprises a toroidal dryer.

9. A process for drying organic waste which comprises the steps of:

(a) admixing a first solids recycle stream with an organic waste stream comprising water, volatile liquid hydrocarbons, and organic waste in a mixing zone and forming a mixing zone effluent stream;

(b) passing the mixing zone effluent stream into a drying zone operated at drying conditions and effecting the vaporization of water and hydrocarbons contained in the mixing zone effluent stream and the production of a drying zone effluent stream comprising organic waste, water vapor, and vaporized hydrocarbons derived from the organic waste stream;

(c) admixing a hereinafter described second solids recycle stream with the drying zone effluent stream at conditions which promote the adsorption of vaporized hydrocarbons by the second solids recycle stream;

(d) separating the drying zone effluent stream in a solids-vapor separating zone and producing a vapor stream comprising water vapor and a dry solids stream comprising particulate organic waste and containing less than about 15 wt.% water;

(e) separating the dry solids stream into three portions and admixing a first portion of the dry solids stream with the organic waste stream as the first solids recycle stream of step (a);

(f) admixing a second portion of the dry solids stream with the drying zone effluent stream as the second solids recycle stream of step (c); and, (g) extruding a third portion of the dry solids stream in an extrusion zone under conditions sufficient to cause the plasticization of the dry solids and the formation of a product stream having a bulk density of about 30–65 lb/ft$^3$.

10. The process of claim 9 wherein the organic waste stream contains over 75 wt.% water and the dry solids stream contains less than about 12 wt.% water.

11. The process of claim 10 wherein the drying zone comprises a toroidal dryer.

* * * * *